United States Patent Office 3,806,529
Patented Apr. 23, 1974

3,806,529
PROCESS FOR PREPARING CARBOXYLIC ACIDS OR THE ALKALI METAL SALTS OF THESE ACIDS
Reginoldus Havinga, Schalkhaar, and Hendrik Wolterus Klavers, Bathmen, Netherlands, assignors to Akzo N.V., Arnhem, Netherlands
No Drawing. Filed May 2, 1972, Ser. No. 249,508
Claims priority, application Netherlands, May 7, 1971, 7106266
Int. Cl. C07c *51/16, 51/30*
U.S. Cl. 260—413                                      10 Claims

ABSTRACT OF THE DISCLOSURE

A process for the preparation of carboxylic acids having the general formula RCOOH, in which R is a straight or branched chain alkyl group containing at least 4 carbon atoms or the corresponding alkali metal salts of said acids by the oxidation of alcohols, aldehydes, ketones or esters with a molten alkali metal hydroxide, in which the oxidation is carried out in the presence of an alkali metal salt derived from a carboxylic acid having the general formula R'COOH in which R' is a hydrogen atom or a straight or branched chain alkyl group different from R, in an amount sufficient to keep the oxidation mixture in the molting state during the oxidation and recovering the corresponding carboxylic acids from the resultant alkali metal salts, if desired.

The alkali metal salt derived from a carboxylic acid having the general formula R'COOH may be formed in situ by adding to the mixture a compound of the general formula R'COOH, an ester thereof or a compound with the general formula R'CH$_2$OH wherein R' has the meaning as hereinbefore defined.

---

This invention relates to a process for the preparation of alkali metal salts of straight or branched chain aliphatic monobasic carboxylic acids having at least 5 carbon atoms and the corresponding carboxylic acid.

Alkali metal salts of aliphatic carboxylic acids may be obtained by reacting aliphatic primary or secondary alcohols, aldehydes or ketones with a molten alkali metal hydroxide, with vigorous stirring, at a temperature of 250° to 375° C. Hydrogen and/or saturated hydrocarbons are formed as by-products. Esters of the alcohols may also be used as the starting materials. These esters are hydrolyzed by the alkali metal hydroxide present and the alcohols formed are then converted into the alkali metal salt as above. If desired, the corresponding carboxylic acids may be obtained from the alkali metal salts formed. In order to achieve this, the salts are dissolved in water, the resultant solution is acidified with an inorganic acid and the organic acids are separated.

For practical reasons, the starting materials preferred are those which form only hydrogen or essentially low molecular weight hydrocarbons such as methane, as the byproducts.

Sodium hydroxide or potassium hydroxide is usually employed as the oxidizing agent but for reasons of economy, sodium hydroxide is preferred. However, the use of these hydroxides per se has the disadvantage that the reaction mixture may be vary viscous or even solid for a short or long time during the oxidation. As a result of this, it is either very difficult or even impossible to stir the mixture and so side reactions may occur.

This disadvantage may be reduced to a considerable extent by carrying out the oxidation process in a closed apparatus under pressure, at high temperatures and in the presence of a large excess of the organic starting material, which also acts as a dispersing agent.

In U.S. Pat. 1,934,648, it is proposed to employ a melt of a mixture of sodium and potassium hydroxides containing at least 50–66 mol. percent of potassium hydroxide as the oxidizing agent in the initial stage of the oxidation. In order to prevent undesired side reactions, it is recommended to incorporate a small quantity of water in the melt. According to this patent specification, in the conversion of higher primary monohydric aliphatic alcohols using a melt of potassium and sodium hydroxides containing less than 50 mol. percent of potassium hydroxide, the reaction mixture becomes difficult to stir and may even solidify.

It has now been found that in the preparation of alkali metal salts of carboxylic acids having the general formula R.COOH, in which R is a straight or branched chain alkyl group having at least 4 carbon atoms, the reaction mixture remains in the molten state not only during the initial stage but throughout the whole of the oxidation reaction between alcohols, aldehydes, ketones or esters and a molten alkali metal hydroxide when the oxidation takes place in the presence of an alkali metal salt derived from a carboxylic acid having the general formula R'COOH, in which R' is a hydrogen atom or a straight or branched chain alkyl group different from R. In this way, the reaction can be continued until the quantity of caustic soda originally present is almost completely converted.

The nature of the metal salt added depends upon the original starting material. In the preparation of alkali metal salts of carboxylic acids having a straight carbon chain, alkali metal salts derived from carboxylic acids having a branched carbon chain may be advantageously employed, preferably the salts of α-branched carboxylic acids, such as 2-ethyl-hexanoic acid and diethyl-acetic acid. It has been found that the addition of relatively small amounts of these salts exerts a sufficiently great melting point reducing effect. Moreover, the acids of these salts have a sharp boiling point and so they may be easily removed from the acid mixture obtained after acidification, for example by distillation.

In the preparation of carboxylic alkali metal salts having a branched carbon chain, alkali metal salts derived from carboxylic acids having a straight carbon chain with up to 4 carbon atoms may be advantageously used, preferably the acetates and propionates. It has been found that the addition of small amounts of these salts also exerts a sufficiently great melting point reducing effect. Moreover, acetic acid or propionic acid may be removed from the acid mixtures obtained after acidification in a simple manner, namely by washing with water.

The salts used in the present invention may also be formed in situ. In order to achieve this, a compound having the general formula R'COOH, an ester thereof or a compound having the general formula R'CH$_2$OH, in which R' has the meaning hereinbefore defined, is added to the oxidation mixture. In this instance, an allowance has to be made for the part of the melt used in the in situ formation of the melting point reducing salt.

When the alkali metal salts are employed as melting point reducers, a melt of sodium hydroxide or of a mixture of sodium hydroxide and potassium hydroxide, containing at least 50 mol percent NaOH may be used. The oxidation may be carried out under atmospheric pressure and at a temperature in the range of 250° to 350° C.

The quantity of the alkali metal salt used may vary over wide limits. It is determined by the melting point reducing effect which is to be achieved, the temperature at which the oxidation is carried out and the composition of the melt. Generally, quantities ranging from 5 to 30 mol percent with respect to the quantity of sodium hydroxide or the sodium hydroxide-potassium hydroxide mixture used will be sufficient.

The starting materials which may be used include:

(1) branched alcohols, such as 2-ethylbutanol, 2-ethylhexanol, 2-octyldodecanol and alcohols or alcohol mixtures prepared according to the "OXO" process, such as isononanol ($C_9$-isomers, mainly 3,5,5-trimethyl-hexanol), isodecanol ($C_{10}$-isomers), isotridecanol ($C_{13}$-isomers) and branched alcohols having 18 C-atoms;

(2) unbranched primary monohydric alcohols having an even number of carbon atoms or a mixture of these prepared according to the "Ziegler" process, such as hexanol, octanol, octanol-decanol mixtures, dodecanol, tetradecanol, dodecanol-tetradecanol mixtures and alcohols having 16 carbon atoms and also straight primary monohydric alcohols or mixtures of these prepared from α-olefins according to the "OXO" process;

(3) aldehydes, such as 2-ethylhexyl-aldehyde and n-nonylaldehyde;

(4) ketones, such as methylisobutyl ketone, methylisoamyl ketone, methylnonyl ketone and methylheptyl ketone; and (5) esters occurring in the so-called bottoms (heavy ends of Dickoele) of "OXO" processes and esters occurring in nature, such as esters derived from valeric acid.

The process according to the invention is preferably carried out as follows. The alkali metal hydroxide and a small quantity, the so-called starting quantity, of a carboxylic acid are put into a reactor which is suitable for being operated at 1 atmos. pressure. This carboxylic acid may be the acid which is to be prepared, a carboxylic acid which forms in situ, an alkali metal salt which reduces the melting point or any mixture of such acids. Subsequently the temperature is raised until the contents of the reactor become liquid and the mixture is then heated to the reaction temperature with stirring. The material which is to be converted into the carboxylic acid salt is then pumped into the reactor. The acid or the alcohol which forms in situ the desired melting point reducing salt may have been already added to this material. The gases formed as byproducts during the reaction are removed via a cooler and a demister. Materials distilling over are carried back into the reactor. After the reaction has been terminated, the reaction mixture is dissolved in water. If desired, the solution of soap obtained may be acidified with a strong inorganic acid and the carboxylic acids formed then separated in order to eliminate any remaining inorganic melting point reducing acid, washed to neutrality and subsequently dried. If the melting point reducing acids cannot be washed out, they are, if desired, eliminated by fractional distillation.

The following nonlimitative examples serve to illustrate the invention. Numerous variations are possible within the scope of the invention; for example, a small quantity of water may be added to the melt to prevent side reactions.

EXAMPLE I

A mixture of 1645 g. (12.65 mol) of n-octanol and 756 g. (5.25 mol) of isononanol containing about 85% by weight of 3,5,5-trimethylhexanol-1 and about 15% by weight of α-branched $C_9$-alcohols was added to a mixture of 670 g. of 95% by weight NaOH, 335 g. of 85% by weight KOH (21 mol of base total) and 332 g. (2.1 mol) of isononaic acid containing about 85% by weight of 3,5,5-trimethylhexanoic acid and about 15% by weight of α-branched $C_9$-acids with stirring at a temperature of 310° C. over a period of 4 hours. During this period, the mixture remained thinly liquid.

A mixture of alkali metal salts was obtained, containing about:

35 mol percent of isononanoate
60 mol percent of octanoate
5 mol percent of hydroxides.

In order to isolate the acids, the mixture was diluted with about 5–6 l. of water and acidified with 2200 g. of 36% by weight HCl (21.7 mol). After being separated, the organic layer was washed to neutrality and subsequently dried.

2834 g. of an acid mixture were obtained having an acid number of 374 and a content of octanoic acid of 61%. Yield 95%.

EXAMPLE II

A mixture of 390 g. (3 mol) of 2-ethylhexanol-1 and 1960 g. (8.1 mol) of n-hexadecanol-1 was added to a mixture of 480 g. of 95% by weight NaOH, 240 g. of 85% by weight KOH (15 mol of base total), 231 g. (0.9 mol) of n-hexadecanoic acid and 324 g. (2.2 mol) of 2-ethylhexanoic acid with stirring at a temperature of 280° C. over a period of 5 hours. During this period the mixture remained liquid.

A mixture of alkali metal salts was obtained, containing about:

60 mol percent of hexadecanoate
35 mol percent of 2-ethylhexanoate
5 mol percent of hydroxides.

In order to isolate the acids, the mixture was diluted with about 10 l. of water and acidified with 1530 g. of 50% by weight $H_2SO_4$ (7.8 mol); the organic layer was then separated, washed to neutrality and subsequently dried.

2722 g. of an acid mixture were obtained having a content of 71% n-hexadecanoic acid and 25% 2-ethylhexanoic acid. After distillation 1965 g. of n-hexadecanoic acid were obtained from this mixture. Yield 85%.

EXAMPLE III 2305 g. (17 mol) of a mixture consisting of α-unbranched $C_8$-isomeric alcohols were added to a mixture of 670 g. of 95% by weight NaOH, 335 g. of 85% by weight KOH (21 mol of base total) and 425 g. (2.95 mol) of a carboxylic acid mixture containing α-unbranched $C_8$-carboxylic acids, n-hexanoic acid, n-octanoic acid and n-decanoic acid with stirring at a temperature of 300°–320° C. over a period of 3 hours. During this period, the mixture remained thinly liquid.

In order to isolate the acids from the salt mixture obtained, this mixture was dilute with 5–6 l. of water and acidified with 2200 g. of 36% by weight HCl (21.7 mol). After being separated, the organic layer was washed to neutrality and then dried.

2655 g. of an acid mixture was obtained having an acid number of 385 and a content of 1.8% n-hexanoic acid, 4.8% n-octanoic acid, 4.2% n-decanoic acid and 89–2% iso-octanoic acid. Yield 90%.

EXAMPLE IV 2270 g. (15.8 mol) of isononanol containing about 85% by weight of 3,5,5-trimethylhexanol and about 15% by weight of α-unbranched $C_9$-alcohols were added to a mixture of 840 g. (20 mol) of 95% by weight NaOH, 316 g. (2 mol) of isononaic acid containing about 85% by weight of 3,5,5-trimethylhexanoic acid and about 15% by weight of α-unbranched $C_9$-carboxylic acids and 89 g. (1.2 mol) of n-propionic acid with stirring at a temperature of 320° C. over a period of 3 hours. During this period the reaction mixture remained thinly liquid.

A mixture of alkali metal salts was obtained, containing about:

89 mol percent of Na-isononanoate
6 mol percent of Na-propionate
5 mol percent of Na-hydroxide.

In order to isolate the acids, the mixture was diluted with about 6 l. of water and acidified with 2130 g. of 36% by weight HCl (21 mol); the organic layer was then separated, washed to neutrality and subsequently dried.

2558 g. of an acid were obtained having an acid number of 352 and a content of isononaic acid of 99.9%. Yield 91%.

EXAMPLE V 1700 g. (17 mol) of methylisobutyl ketone were added to a mixture of 517 g. of 95% by weight NaOH, 517 g. of 85% by weight KOH (20 mol total) and 288 g. (2 mol) of 2-ethylhexanoic acid with stirring at a temperature of 330° C. over a period of 5 hours. During this period the mixture remained liquid.

In order to isolate the acids, the mixture was diluted with about 5 l. of water and acidified with 2130 g. of 36% by weight HCl (21 mol); the organic layer was then separated, washed to neutrality, dried and subjected to fractional distillation.

1148 g. of isovaleric acid were obtained. Yield 66%.

EXAMPLE VI 2130 g. (15 mol) of a mixture consisting of α-unbranched $C_9$-isomeric aldehydes were added to the mixture of sodium and potassium hydroxide described in Example I and 720 g. (5 mol) of 2-ethylhexanoic acid with stirring at a temperature of 305°–330° C. over a period of 4 hours. During this period, the mixture remained thinly liquid.

A mixture of alkali metal salts was obtained, containing about:

71 mol percent of isononanoate
24 mol percent of 2-ethylhexanoate
5 mol percent of hydroxides.

In order to isolate the acids, this mixture was diluted with about 6 l. of water and acidified with 2200 g. of 36% by weight HCl (21.7 mol). After being separated, the organic layer was washed to neutrality and then dried.

2625 g. of an acid mixture were obtained, having an acid number of 362 and a content of 76% isononaic acid and 24% 2-ethylhexanoic acid. Yield 85%.

EXAMPLE VII 1800 g. (9 mol) of 1,4-dimethyl pentylisovaleriate were added to the mixture of sodium and potassium hydroxide described in Example I and 302.5 g. (2.1 mol) of 2-ethylhexanoic acid with stirring at a temperature of 320° C. over a period of 4 hours. During this period, the mixture remained thinly liquid.

A mixture of alkali metal salts was obtained, containing about:

43 mol percent of isovaleriate
43 mol percent of isocaproate
40 mol percent of 2-ethylhexanoate
4 mol percent of hydroxides.

In order to isolate the acids, this mixture was diluted with about 6 l. of water and acidified with 2200 g. of 36% by weight HCl (21.7 mol). After being separated, the organic layer was washed to neutrality, dried and subjected to fractional distillation. This yielded:

700 g. of isovaleric acid, yield 76%,
224 g. of 2-ethylhexanoic acid, yield 74% and
801 g. of isocapronic acid, yield 77%.

EXAMPLE VIII 63 g. (1.05 mol) of acetic acid were added to the mixture of hydroxides and isononaic acid described in Example I, and subsequently 2420 g. (16.8 mol) of a mixture consisting of 85% of 3,5,5-trimethylhexanol and 15% of α-unbranched $C_9$-alcohols were added with stirring at a temperature of 320° C. over a period of about 4 hours. During this period the mixture remained thinly liquid.

A mixture of alkali metal salts was obtained, containing about:

90 mol percent of isononanoate
5 mol percent of acetate
5 mol percent of hydroxides.

In order to isolate the acids, this mixture was diluted with about 6 l. of water and acidified with 2125 g. of 50% by weight $H_2SO_4$ (10.8 mol). Subsequently, the organic layer was separated, washed to neutrality and dried.

2805 g. of an acid were obtained having an acid number of 353 and a content of isonanaic acid of more than 99.9%. Yield 94%.

EXAMPLE IX

A mixture consisting of 306 g. (3 mol) of 2-ethylbutanol-1 and 1280 g. (8.1 mol) of n-decanol-1 was added to a mixture of 480 g. of 95% by weight NaOH, 240 g. of 85% by weight KOH (15 mol of base total), 155 g. (0.9 mol) of n-decanoic acid and 255 g. (2.2 mol) of diethyl acetic acid with stirring at a temperature of 315° C. over a period of 5 hours. During this period, the mixture remained thinly liquid.

A mixture of alkali metal salts was obtained containing about:

60 mol percent of decanoate
35 mol percent of diethyl acetate
5 mol percent of hyroxides.

In order to isolate the acids, the mixture was diluted with about 10 l. of water and acidified with 1600 g. of 36% by weight HCl (15.7 mol). Subsequently the organic layer was separated, dried and subjected to functional distillation.

1340 g. of n-decanoic acid were obtained. Yield 86%.

EXAMPLE X

A mixture of 260 g. (2 mol) of 2-ethylhexanol and 1368 g. (12 mol) of n-heptanal was added to a mixture of 630 g. of 95% by weight NaOH, 315 g. of 85% by weight KOH (20 mol of base total) and 720 g. (5 mol) of 2-ethylhexanoic acid with stirring at a temperature of 320° C. over a period of 4 hours. During this period, the mixture remained thinly liquid.

A mixture of alkali metal salts was obtained, containing about:

60 mol percent of heptanoate
35 mol percent of 2-ethylhexanoate
5 mol percent of hydroxides.

In order to isolate the acids, the mixture was diluted with about 6 l. of water and acidified with 2117 g. of 50% by weight $H_2SO_4$ (10.8 mol). Subsequently, the organic layer was separated, washed to neutrality, dried and subjected to fractional distillation.

1320 g. of n-heptanoic acid were obtained. Yield 85%.

Example XI 260 g. (2 mol) of 2-ethylhexanol and 1820 g. (14 mol) of isooctanol were added to a mixture of 840 g. of 95% by weight NaOH (20 mol) and 432 g. (3 mol) of 2-ethylhexanoic acid with stirring at a temperature of 320° C. over a period of 4 hours. During this period, the reaction mixture remained liquid.

A mixture of alkali metal salts was obtained, containing about:

70 mol percent of Na-isooctanoate
25 mol percent of Na-2-ethylhexanoate
5 mol percent of Na-hydroxide.

In order to isolate the acids, this mixture was diluted with about 6 l. of water and acidified with 2090 g. of 36% by weight HCl (20.6 mol). Subsequently, the organic layer was separated, washed to neutrality and dried.

2490 g. of an acid mixture were obtained, having a content of 73.1% isooctanoic acid and 26.1% 2-ethylhexanoic acid. Yield 91%.

EXAMPLE XII 2600 g. (13 mol) of isotridecanol were added to a mixture of 517 g. of 95% by weight NaOH, 517 g. of 85% by weight KOH (20 mol of base total), 642 g. (3 mol) of isotridecanoic acid and 180 g. (3 mol) of acetic acid with stirring at a temperature of 320° C. over a period of 4 hours. During this period, the reaction mixture remained liquid.

A mixture of alkali metal salts was obtained, containing about:

80 mol percent of isotridecanoate
15 mol percent of acetate
5 mol percent of hydroxides.

In order to isolate the acids, this mixture was diluted with 6 l. of water, acidified with 2130 g. of 36% by weight HCl (21 mol) and the organic layer was then separated. Subsequently, this layer was washed to neutrality and dried.

3152 g. of isotridecanoic acid were obtained. Content 99.0%; acid number 264; yield 92%.

EXAMPLE XIII 425 g. (2.5 mol) of methyl-n-nonylketone were added to a mixture of 156 g. of 98% by weight NaOH, 78 g. of 85% by weight KOH (5 mol of base total) and 288 g. (2 mol) of 2-ethylhexanoic acid with stirring at a temperature of 320° C. over a period of 2.5 hours. During this period, the reaction mixture remained thinly liquid.

In order to isolate the acids, the mixture was diluted with 2 l. of water and acidified with 513 g. of 36% by weight HCl (5.05 mol). The organic layer was separated washed to neutrality, dried and subjected to fractional distillation.

348 g. of n-decanoic acid were obtained. Yield 88%.

Example XIV 134 g. (0.45 mol) of 2-n-octyldodecanol and 21 g. (0.35 mol) of acetic acid were added to a mixture of 26 g. of 98% by weight NaOH, 26 g. of 85% by weight KOH (1 mol of base total) and 6 g. (0.1 mol) of acetic acid with stirring at a temperature of 310° C. over a period of 1 hour. During this period, the mixture remained thinly liquid.

A mixture of alkali metal salts was obtained, containing about:

45 mol percent of 2-n-octyldodecanoate
45 mol percent of acetate
10 mol percent of hydroxides.

In order to isolate the acids, this mixture was diluted with about 0.5 l. of water and acidified with 120 ml. of 36% by weight HCl (1.2 mol). Subsequently, the organic layer was separated, washed to neutrality and dried.

134 g. of 2-n-octyldodecanoic acid were obtained. Acid number 174.8; yield 96%.

What is claimed is:

1. In the preparation of an alkali metal salt of a carboxylic acid having the formula RCOOH wherein R is an alkyl group containing at least 4 carbon atoms by a process wherein an alcohol, aldehyde, ketone or ester is oxidized in molten alkali metal hydroxide, the improved method of maintaining the mixture molten at atmospheric pressure which comprises mixing with the said mixture an alkali metal salt of a carboxylic acid which is capable of reducing the melting point of the mixture and has the formula R'COOH wherein R' is hydrogen or an alkyl group which is different from R in an amount sufficient to keep the mixture molten under the oxidation conditions.

2. The process of claim 1 wherein the reaction is conducted at from 250° to 350° C.

3. The process of claim 1 wherein R is a straight chain and R' is a branched chain.

4. The process of claim 1 wherein R is a branched chain and R' is a straight chain.

5. A process as claimed in claim 1, in which the alkali metal salt is formed in situ by adding to the mixture a compound of the general formula R'COOH, an ester thereof or a compound with the general formula

R'CH$_2$OH wherein R' is as hereinbefore defined.

6. A process as claimed in claim 3, in which the branched chain carboxylic acid is an α-branched chain carboxylic acid.

7. A process as claimed in claim 6, in which the α-branched chain carboxylic acid is 2-ethylhexanoic acid or diethyl acetic acid.

8. A process as claimed in claim 4, in which the straight chain carboxylic acid is acetic acid or propionic acid.

9. A process as claimed in claim 1, in which the alkali metal hydroxide melt comprises a mixture of sodium hydroxide and potassium hydroxide containing at least 50 mol percent of sodium hydroxide.

10. A process as claimed in claim 1, in which the alkali metal hydroxide melt comprises sodium hydroxide.

References Cited

UNITED STATES PATENTS

| | | | |
|---|---|---|---|
| 2,766,267 | 10/1956 | Hill | 260—531 C |
| 2,801,973 | 8/1957 | Morway et al. | 260—530 R |
| 2,801,975 | 8/1957 | Bartlett et al. | 260—531 C |
| 3,560,537 | 2/1971 | Eller | 260—531 C |
| 3,558,678 | 1/1971 | Fanning | 260—531 C |

LORRAINE A. WEINBERGER, Primary Examiner

R. D. KELLY, Assistant Examiner

U.S. Cl. X.R.

260—530 R, 531 C, 540